US010681006B2

(12) United States Patent
Hulick, Jr.

(10) Patent No.: US 10,681,006 B2
(45) Date of Patent: Jun. 9, 2020

(54) APPLICATION-CONTEXT-AWARE FIREWALL

(71) Applicant: Cisco Technology, Inc., San Jose, CA (US)

(72) Inventor: Walter Theodore Hulick, Jr., Pearland, TX (US)

(73) Assignee: Cisco Technology, Inc., San Jose, CA (US)

( * ) Notice: Subject to any disclaimer, the term of this patent is extended or adjusted under 35 U.S.C. 154(b) by 266 days.

(21) Appl. No.: 15/800,013

(22) Filed: Oct. 31, 2017

(65) Prior Publication Data

US 2019/0132289 A1 May 2, 2019

(51) Int. Cl.
*H04L 29/06* (2006.01)

(52) U.S. Cl.
CPC ...... *H04L 63/0227* (2013.01); *H04L 63/0245* (2013.01); *H04L 63/0281* (2013.01); *H04L 63/0272* (2013.01)

(58) Field of Classification Search
None
See application file for complete search history.

(56) References Cited

U.S. PATENT DOCUMENTS

| 2003/0084056 A1* | 5/2003 | DeAnna | G06F 9/465 |
| 2012/0311664 A1* | 12/2012 | Elrod | H04L 63/0227 726/1 |
| 2018/0041470 A1* | 2/2018 | Schultz | H04L 63/029 |

\* cited by examiner

*Primary Examiner* — Andrew J Steinle
(74) *Attorney, Agent, or Firm* — Behmke Innovation Group LLC; James M. Behmke; Jonathon P. Western

(57) ABSTRACT

In one embodiment, an agent process associated with a particular application on a computing device intercepts outbound connection calls made by the particular application for a remote target host within a computer network, and determines an application context for the outbound connection call based on the particular application and one or more features of the outbound connection call. The agent process may then compare the application context against a set of application-context-aware firewall policies configured on the agent process, and determines whether to allow or not allow (block) the outbound connection call based on the comparing of the application context to the set of application-context-aware firewall policies.

22 Claims, 13 Drawing Sheets

APPLICATION-CONTEXT-AWARE FIREWALL

TECHNICAL FIELD

The present disclosure relates generally to computer networks, and, more particularly, to an application-context-aware firewall.

BACKGROUND

Modern day application servers generally accept inbound connections. However, they also generate outbound connections to external web services, databases, and/or mainframe gateways. Many of the applications on these servers rely on open source libraries that were developed around the world. Unfortunately, the Internet today is full of malicious programming, including malware, denial of service (DoS) attack bots, and so on. The applications using these open source libraries (or other services or proprietary libraries) generally have no choice but to trust that the programming does not make "rogue connections", potentially sending confidential customer information or intellectual property to hackers and/or those who wish to exploit the captured data or to benefit via ransomware or some other purpose.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
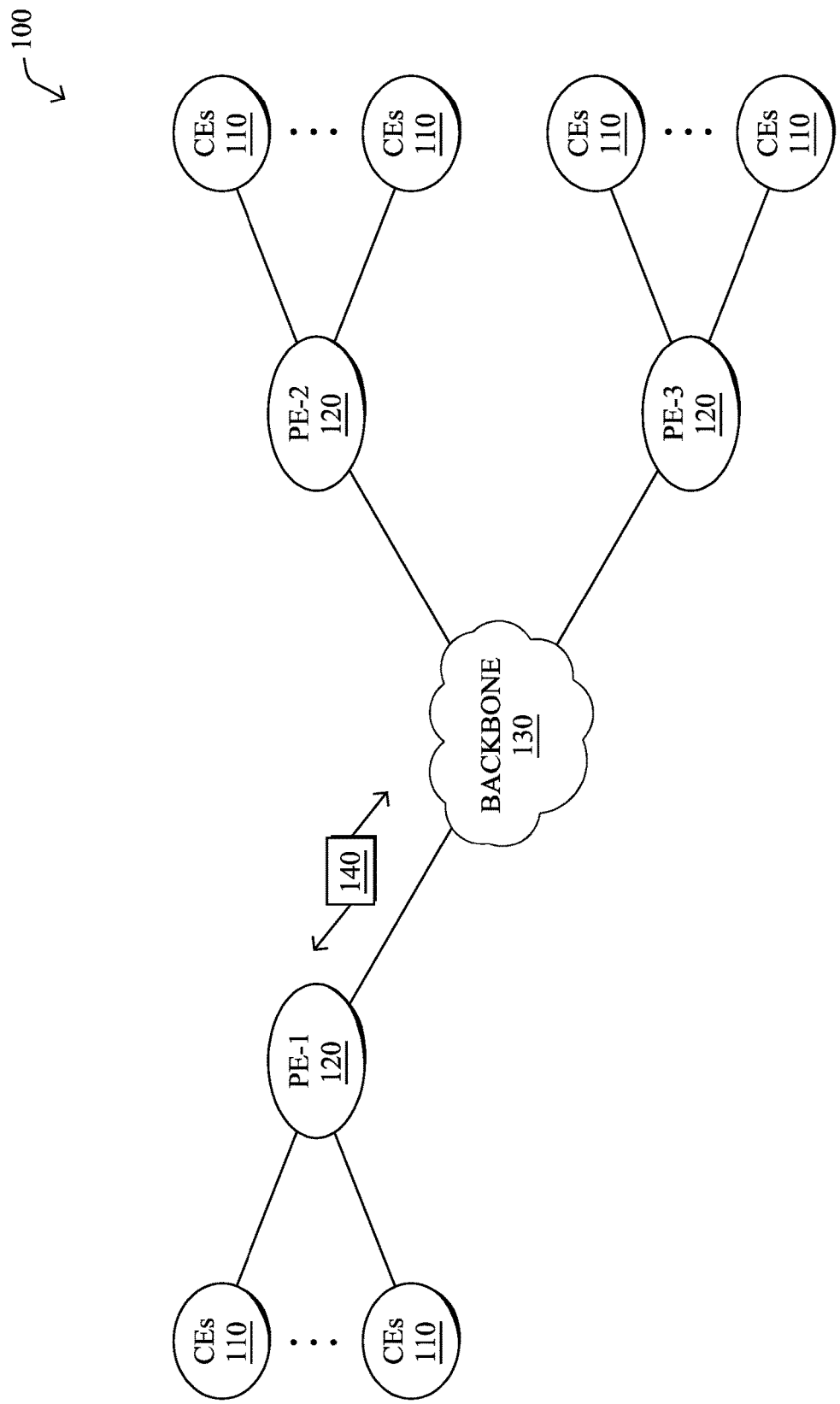
FIGS. 1A-1B illustrate an example computer network.

According to one or more embodiments of the disclosure, techniques herein provide an application-context-aware firewall. In particular, in one embodiment, an agent process associated with a particular application on a computing device intercepts outbound connection calls made by the particular application for a remote target host within a computer network, and determines an application context for the outbound connection call based on the particular application and one or more features of the outbound connection call. The agent process may then compare the application context against a set of application-context-aware firewall policies configured on the agent process, and determines whether to allow or not allow (block) the outbound connection call based on the comparing of the application context to the set of application-context-aware firewall policies.

DESCRIPTION

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), and others. The Internet is an example of a WAN that connects disparate networks throughout the world, providing global communication between nodes on various networks. Other types of networks, such as field area networks (FANs), neighborhood area networks (NANs), personal area networks (PANs), enterprise networks, etc. may also make up the components of any given computer network.

The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or power-line communication networks. That is, in addition to one or more sensors, each sensor device (node) in a sensor network may generally be equipped with a radio transceiver or other communication port, a microcontroller, and an energy source, such as a battery. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics.

Figure 1B:
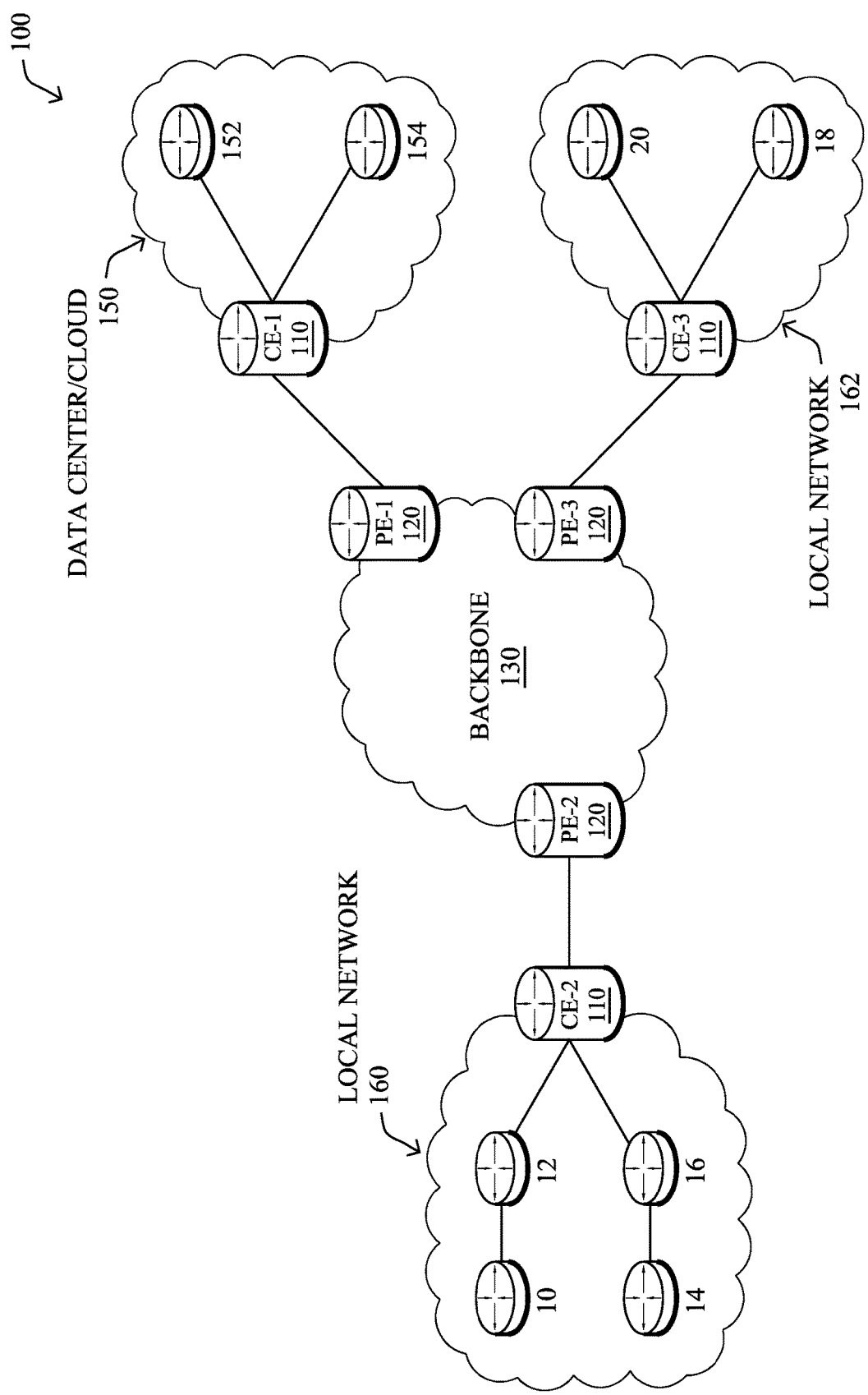

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations. Servers 152-154 may include, in various embodiments, any number of suitable servers or other cloud-based resources. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc. Furthermore, in various embodiments, network 100 may include one or more mesh networks, such as an Internet of Things network. Loosely, the term "Internet of Things" or "IoT" refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless networks, are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen to thousands or even millions of LLN routers, and support point-to-point traffic (between devices inside the LLN), point-to-multipoint traffic (from a central control point such at the root node to a subset of devices inside the LLN), and multipoint-to-point traffic (from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

In contrast to traditional networks, LLNs face a number of communication challenges. First, LLNs communicate over a physical medium that is strongly affected by environmental conditions that change over time. Some examples include temporal changes in interference (e.g., other wireless networks or electrical appliances), physical obstructions (e.g., doors opening/closing, seasonal changes such as the foliage density of trees, etc.), and propagation characteristics of the physical media (e.g., temperature or humidity changes, etc.). The time scales of such temporal changes can range between milliseconds (e.g., transmissions from other transceivers) to months (e.g., seasonal changes of an outdoor environment). In addition, LLN devices typically use low-cost and low-power designs that limit the capabilities of their transceivers. In particular, LLN transceivers typically provide low throughput. Furthermore, LLN transceivers typically support limited link margin, making the effects of interference and environmental changes visible to link and network protocols. The high number of nodes in LLNs in comparison to traditional networks also makes routing, quality of service (QoS), security, network management, and traffic engineering extremely challenging, to mention a few.

Figure 2:
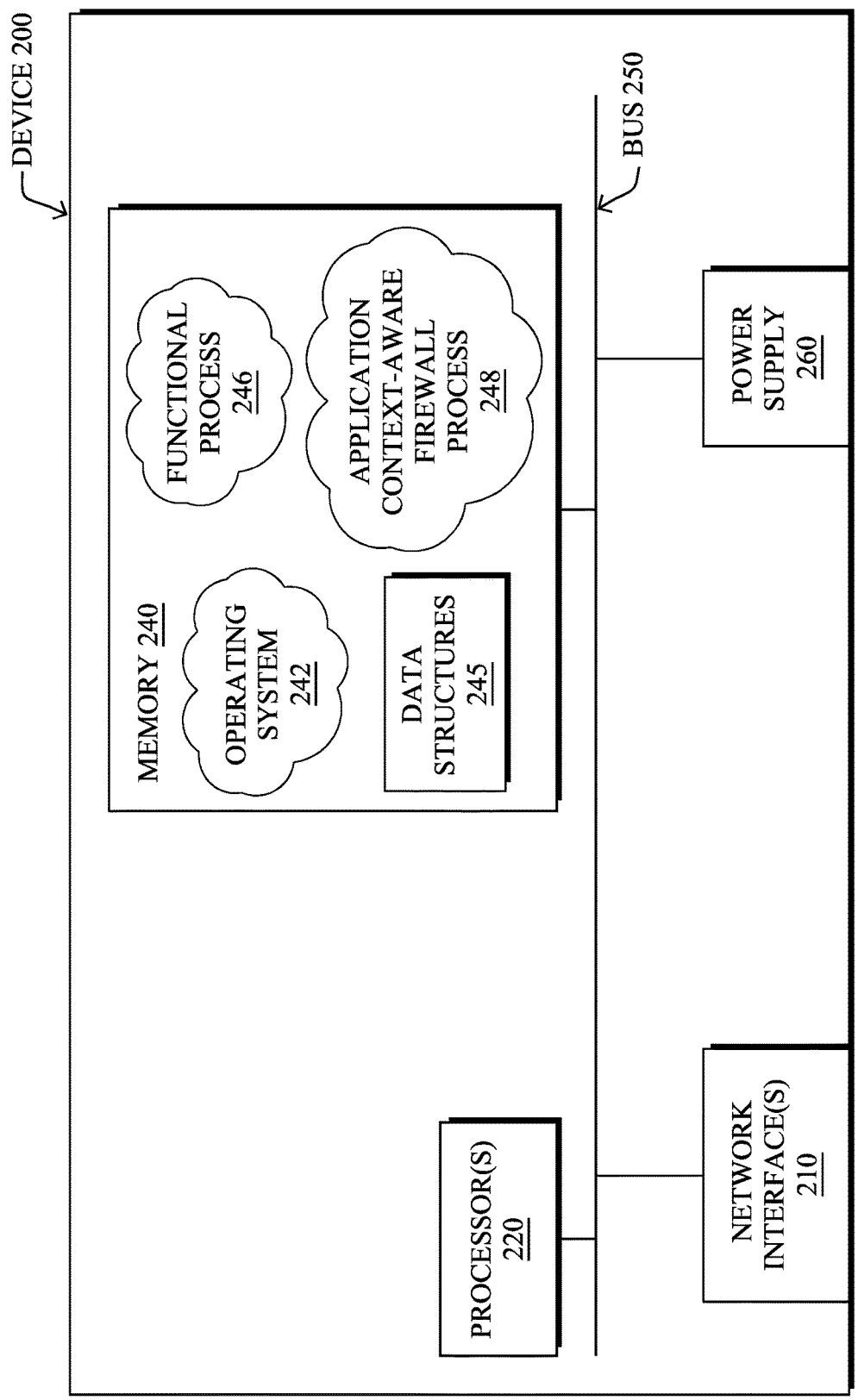
FIG. 2 illustrates an example computing device/node.

FIG. 2 is a schematic block diagram of an example computing device 200 that may be used with one or more embodiments described herein, e.g., as any of the devices shown in FIG. 1 above, and particularly as specific devices as described further below. The device may comprise one or more network interfaces 210 (e.g., wired, wireless, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links coupled to the network 100, e.g., providing a data connection between device 200 and the data network, such as the Internet. The network interfaces may be configured to transmit and/or receive data using a variety of different communication protocols. For example, interfaces 210 may include wired transceivers, wireless transceivers, cellular transceivers, or the like, each to allow device 200 to communicate information to and from a remote computing device or server over an appropriate network. The same network interfaces 210 also allow communities of multiple devices 200 to interconnect among themselves, either peer-to-peer, or up and down a hierarchy. Note, further, that the nodes may have two different types of network connections 210, e.g., wireless and wired/physical connections, and that the view herein is merely for illustration. Also, while the network interface 210 is shown separately from power supply 260, for devices using powerline communication (PLC) or Power over Ethernet (PoE), the network interface 210 may communicate through the power supply 260, or may be an integral component of the power supply.

The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes and/or services may comprise one or more functional processes (or "applications") 246, and on certain devices, an illustrative "application-context-aware firewall" process 248, as described herein. Notably, functional processes 246, when executed by processor(s) 220, cause each particular device 200 to perform the various functions corresponding to the particular device's purpose and general configuration. For example, a router would be configured to operate as a router, a server would be configured to operate as a server, an access point (or gateway) would be configured to operate as an access point (or gateway), and so on.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

——Application Intelligence Platform——

The embodiments herein relate to an application intelligence platform for application performance management. In one aspect, as discussed with respect to FIGS. 3-5 below, performance within a networking environment may be monitored, specifically by monitoring applications and entities (e.g., transactions, tiers, nodes, and machines) in the networking environment using agents installed at individual machines at the entities. For example, each node can include one or more machines that perform part of the applications. The agents collect data associated with the applications of interest and associated nodes and machines where the applications are being operated. Examples of the collected data may include performance data (e.g., metrics, metadata, etc.) and topology data (e.g., indicating relationship information). The agent-collected data may then be provided to one or more servers or controllers to analyze the data.

Figure 3:
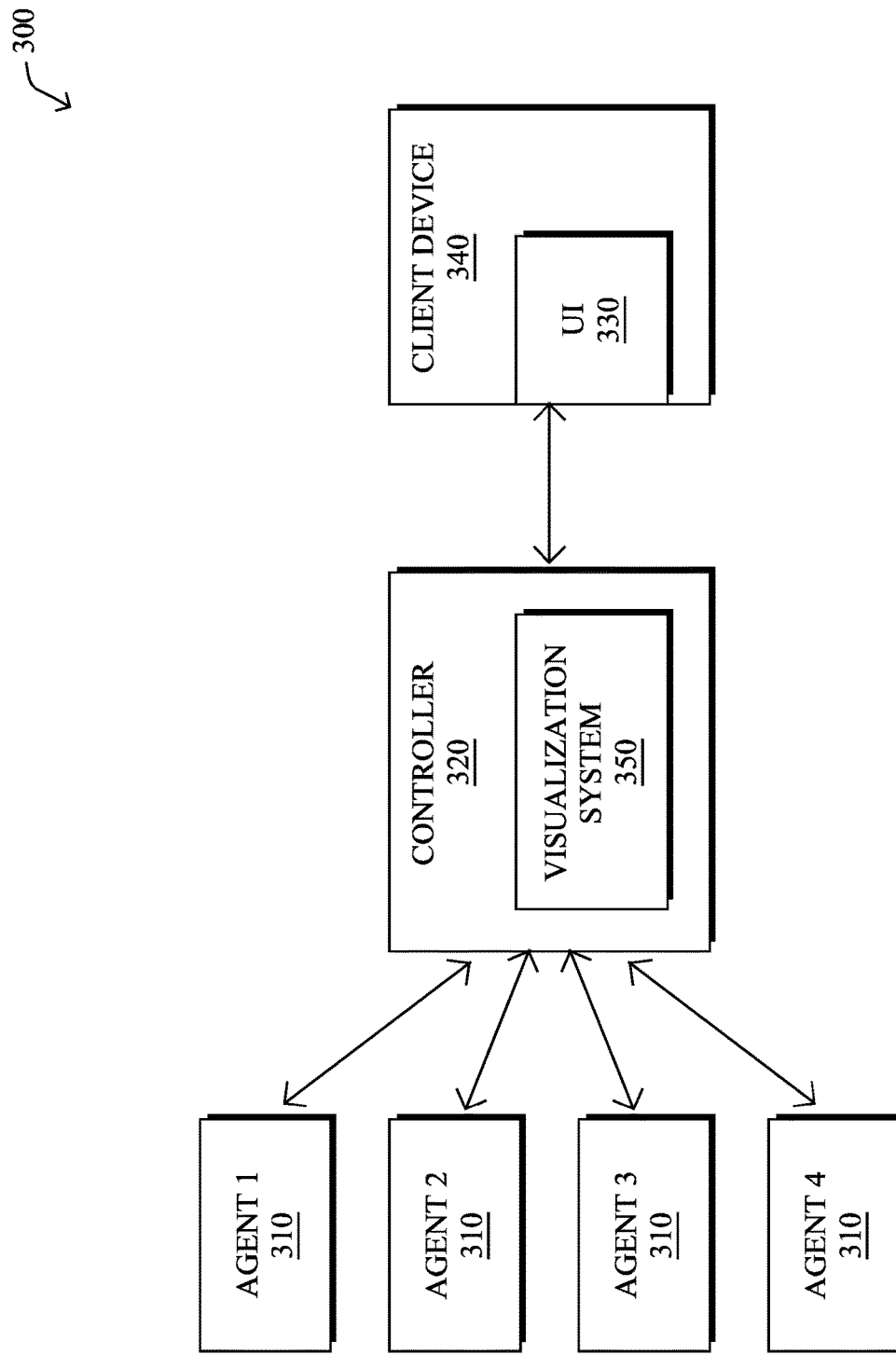
FIG. 3 illustrates an example application intelligence platform.

FIG. 3 is a block diagram of an example application intelligence platform 300 that can implement one or more aspects of the techniques herein. The application intelligence platform is a system that monitors and collects metrics of performance data for an application environment being monitored. At the simplest structure, the application intelligence platform includes one or more agents 310 and one or more servers/controllers 320. Note that while FIG. 3 shows four agents (e.g., Agent 1 through Agent 4) communicatively linked to a single controller, the total number of agents and controllers can vary based on a number of factors including the number of applications monitored, how distributed the application environment is, the level of monitoring desired, the level of user experience desired, and so on.

The controller 320 is the central processing and administration server for the application intelligence platform. The controller 320 serves a browser-based user interface (UI) 330 that is the primary interface for monitoring, analyzing, and troubleshooting the monitored environment. The controller 320 can control and manage monitoring of business transactions (described below) distributed over application servers. Specifically, the controller 320 can receive runtime data from agents 310 (and/or other coordinator devices), associate portions of business transaction data, communicate with agents to configure collection of runtime data, and provide performance data and reporting through the interface 330. The interface 330 may be viewed as a web-based interface viewable by a client device 340. In some implementations, a client device 340 can directly communicate with controller 320 to view an interface for monitoring data. The controller 320 can include a visualization system 350 for displaying the reports and dashboards related to the disclosed technology. In some implementations, the visualization system 350 can be implemented in a separate machine (e.g., a server) different from the one hosting the controller 320.

Notably, in an illustrative Software as a Service (SaaS) implementation, a controller instance 320 may be hosted remotely by a provider of the application intelligence platform 300. In an illustrative on-premise (On-Prem) implementation, a controller instance 320 may be installed locally and self-administered.

The controllers 320 receive data from different agents 310 (e.g., Agents 1-4) deployed to monitor applications, databases and database servers, servers, and end user clients for the monitored environment. Any of the agents 310 can be implemented as different types of agents with specific monitoring duties. For example, application agents may be installed on each server that hosts applications to be monitored. Instrumenting an agent adds an application agent into the runtime process of the application.

Database agents, for example, may be software (e.g., a Java program) installed on a machine that has network access to the monitored databases and the controller. Database agents query the monitored databases in order to collect metrics and pass those metrics along for display in a metric browser (e.g., for database monitoring and analysis within databases pages of the controller's UI 330). Multiple database agents can report to the same controller. Additional database agents can be implemented as backup database agents to take over for the primary database agents during a failure or planned machine downtime. The additional database agents can run on the same machine as the primary agents or on different machines. A database agent can be deployed in each distinct network of the monitored environment. Multiple database agents can run under different user accounts on the same machine.

Standalone machine agents, on the other hand, may be standalone programs (e.g., standalone Java programs) that collect hardware-related performance statistics from the servers (or other suitable devices) in the monitored environment. The standalone machine agents can be deployed on machines that host application servers, database servers, messaging servers, Web servers, etc. A standalone machine agent has an extensible architecture (e.g., designed to accommodate changes).

End user monitoring (EUM) may be performed using browser agents and mobile agents to provide performance information from the point of view of the client, such as a web browser or a mobile native application. Through EUM, web use, mobile use, or combinations thereof (e.g., by real users or synthetic agents) can be monitored based on the monitoring needs. Notably, browser agents (e.g., agents 310) can include Reporters that report monitored data to the controller.

Browser agents and mobile agents are generally unlike other monitoring through application agents, database agents, and standalone machine agents that are on the server. In particular, browser agents may generally be embodied as small files using web-based technologies, such as JavaScript agents injected into each instrumented web page (e.g., as close to the top as possible) as the web page is served, and are configured to collect data. Once the web page has completed loading, the collected data may be bundled into a beacon and sent to an EUM process/cloud for processing and made ready for retrieval by the controller. Browser real user monitoring (Browser RUM) provides insights into the performance of a web application from the point of view of a real or synthetic end user. For example, Browser RUM can determine how specific Ajax or iframe calls are slowing down page load time and how server performance impact end user experience in aggregate or in individual cases.

A mobile agent, on the other hand, may be a small piece of highly performant code that gets added to the source of the mobile application. Mobile RUM provides information on the native mobile application (e.g., iOS or Android applications) as the end users actually use the mobile application. Mobile RUM provides visibility into the functioning of the mobile application itself and the mobile application's interaction with the network used and any server-side applications with which the mobile application communicates.

Application Intelligence Monitoring: The disclosed technology can provide application intelligence data by monitoring an application environment that includes various services such as web applications served from an application server (e.g., Java virtual machine (JVM), Internet Information Services (IIS), Hypertext Preprocessor (PHP) Web server, etc.), databases or other data stores, and remote services such as message queues and caches. The services in the application environment can interact in various ways to provide a set of cohesive user interactions with the application, such as a set of user services applicable to end user customers.

Application Intelligence Modeling: Entities in the application environment (such as the JBoss service, MQSeries modules, and databases) and the services provided by the entities (such as a login transaction, service or product search, or purchase transaction) may be mapped to an application intelligence model. In the application intelligence model, a business transaction represents a particular service provided by the monitored environment. For example, in an e-commerce application, particular real-world services can include a user logging in, searching for items, or adding items to the cart. In a content portal, particular real-world services can include user requests for content such as sports, business, or entertainment news. In a stock trading application, particular real-world services can include operations such as receiving a stock quote, buying, or selling stocks.

Business Transactions: A business transaction representation of the particular service provided by the monitored environment provides a view on performance data in the context of the various tiers that participate in processing a particular request. A business transaction, which may each be identified by a unique business transaction identification (ID), represents the end-to-end processing path used to fulfill a service request in the monitored environment (e.g., adding items to a shopping cart, storing information in a database, purchasing an item online, etc.). Thus, a business transaction is a type of user-initiated action in the monitored environment defined by an entry point and a processing path across application servers, databases, and potentially many other infrastructure components. Each instance of a business transaction is an execution of that transaction in response to a particular user request (e.g., a socket call, illustratively associated with the TCP layer). A business transaction can be created by detecting incoming requests at an entry point and tracking the activity associated with request at the originating tier and across distributed components in the application environment (e.g., associating the business transaction with a 4-tuple of a source IP address, source port, destination IP address, and destination port). A flow map can be generated for a business transaction that shows the touch points for the business transaction in the application environment. In one embodiment, a specific tag may be added to packets by application specific agents for identifying business transactions (e.g., a custom header field attached to an HTTP payload by an application agent, or by a network agent when an application makes a remote socket call), such that packets can be examined by network agents to identify the business transaction identifier (ID) (e.g., a Globally Unique Identifier (GUID) or Universally Unique Identifier (UUID)).

Performance monitoring can be oriented by business transaction to focus on the performance of the services in the application environment from the perspective of end users. Performance monitoring based on business transactions can provide information on whether a service is available (e.g., users can log in, check out, or view their data), response times for users, and the cause of problems when the problems occur.

A business application is the top-level container in the application intelligence model. A business application contains a set of related services and business transactions. In some implementations, a single business application may be needed to model the environment. In some implementations, the application intelligence model of the application environment can be divided into several business applications. Business applications can be organized differently based on the specifics of the application environment. One consideration is to organize the business applications in a way that reflects work teams in a particular organization, since role-based access controls in the Controller UI are oriented by business application.

A node in the application intelligence model corresponds to a monitored server or JVM in the application environment. A node is the smallest unit of the modeled environment. In general, a node corresponds to an individual application server, JVM, or Common Language Runtime (CLR) on which a monitoring Agent is installed. Each node identifies itself in the application intelligence model. The Agent installed at the node is configured to specify the name of the node, tier, and business application under which the Agent reports data to the Controller.

Business applications contain tiers, the unit in the application intelligence model that includes one or more nodes. Each node represents an instrumented service (such as a web application). While a node can be a distinct application in the application environment, in the application intelligence model, a node is a member of a tier, which, along with possibly many other tiers, make up the overall logical business application.

Tiers can be organized in the application intelligence model depending on a mental model of the monitored application environment. For example, identical nodes can be grouped into a single tier (such as a cluster of redundant servers). In some implementations, any set of nodes, identical or not, can be grouped for the purpose of treating certain performance metrics as a unit into a single tier.

The traffic in a business application flows among tiers and can be visualized in a flow map using lines among tiers. In addition, the lines indicating the traffic flows among tiers can be annotated with performance metrics. In the application intelligence model, there may not be any interaction among nodes within a single tier. Also, in some implementations, an application agent node cannot belong to more than one tier. Similarly, a machine agent cannot belong to more than one tier. However, more than one machine agent can be installed on a machine.

A backend is a component that participates in the processing of a business transaction instance. A backend is not instrumented by an agent. A backend may be a web server, database, message queue, or other type of service. The agent recognizes calls to these backend services from instrumented code (called exit calls). When a service is not instrumented and cannot continue the transaction context of the call, the agent determines that the service is a backend component. The agent picks up the transaction context at the response at the backend and continues to follow the context of the transaction from there.

Performance information is available for the backend call. For detailed transaction analysis for the leg of a transaction processed by the backend, the database, web service, or other application need to be instrumented.

The application intelligence platform uses both self-learned baselines and configurable thresholds to help identify application issues. A complex distributed application has a large number of performance metrics and each metric is important in one or more contexts. In such environments, it is difficult to determine the values or ranges that are normal for a particular metric; set meaningful thresholds on which to base and receive relevant alerts; and determine what is a "normal" metric when the application or infrastructure undergoes change. For these reasons, the disclosed application intelligence platform can perform anomaly detection based on dynamic baselines or thresholds.

The disclosed application intelligence platform automatically calculates dynamic baselines for the monitored metrics, defining what is "normal" for each metric based on actual usage. The application intelligence platform uses these baselines to identify subsequent metrics whose values fall out of this normal range. Static thresholds that are tedious to set up and, in rapidly changing application environments, error-prone, are no longer needed.

The disclosed application intelligence platform can use configurable thresholds to maintain service level agreements (SLAs) and ensure optimum performance levels for system by detecting slow, very slow, and stalled transactions. Configurable thresholds provide a flexible way to associate the right business context with a slow request to isolate the root cause.

In addition, health rules can be set up with conditions that use the dynamically generated baselines to trigger alerts or initiate other types of remedial actions when performance problems are occurring or may be about to occur.

For example, dynamic baselines can be used to automatically establish what is considered normal behavior for a particular application. Policies and health rules can be used against baselines or other health indicators for a particular application to detect and troubleshoot problems before users are affected. Health rules can be used to define metric conditions to monitor, such as when the "average response time is four times slower than the baseline". The health rules can be created and modified based on the monitored application environment.

Examples of health rules for testing business transaction performance can include business transaction response time and business transaction error rate. For example, health rule that tests whether the business transaction response time is much higher than normal can define a critical condition as the combination of an average response time greater than the default baseline by 3 standard deviations and a load greater than 50 calls per minute. In some implementations, this health rule can define a warning condition as the combination of an average response time greater than the default baseline by 2 standard deviations and a load greater than 100 calls per minute. In some implementations, the health rule that tests whether the business transaction error rate is much higher than normal can define a critical condition as the combination of an error rate greater than the default baseline by 3 standard deviations and an error rate greater than 10 errors per minute and a load greater than 50 calls per minute. In some implementations, this health rule can define a warning condition as the combination of an error rate greater than the default baseline by 2 standard deviations and an error rate greater than 5 errors per minute and a load greater than 50 calls per minute. These are non-exhaustive and non-limiting examples of health rules and other health rules can be defined as desired by the user.

Policies can be configured to trigger actions when a health rule is violated or when any event occurs. Triggered actions can include notifications, diagnostic actions, auto-scaling capacity, running remediation scripts.

Most of the metrics relate to the overall performance of the application or business transaction (e.g., load, average response time, error rate, etc.) or of the application server infrastructure (e.g., percentage CPU busy, percentage of memory used, etc.). The Metric Browser in the controller UI can be used to view all of the metrics that the agents report to the controller.

In addition, special metrics called information points can be created to report on how a given business (as opposed to a given application) is performing. For example, the performance of the total revenue for a certain product or set of products can be monitored. Also, information points can be used to report on how a given code is performing, for example how many times a specific method is called and how long it is taking to execute. Moreover, extensions that use the machine agent can be created to report user defined custom metrics. These custom metrics are base-lined and reported in the controller, just like the built-in metrics.

All metrics can be accessed programmatically using a Representational State Transfer (REST) API that returns either the JavaScript Object Notation (JSON) or the eXtensible Markup Language (XML) format. Also, the REST API can be used to query and manipulate the application environment.

Snapshots provide a detailed picture of a given application at a certain point in time. Snapshots usually include call graphs that allow that enables drilling down to the line of code that may be causing performance problems. The most common snapshots are transaction snapshots.

Figure 4:
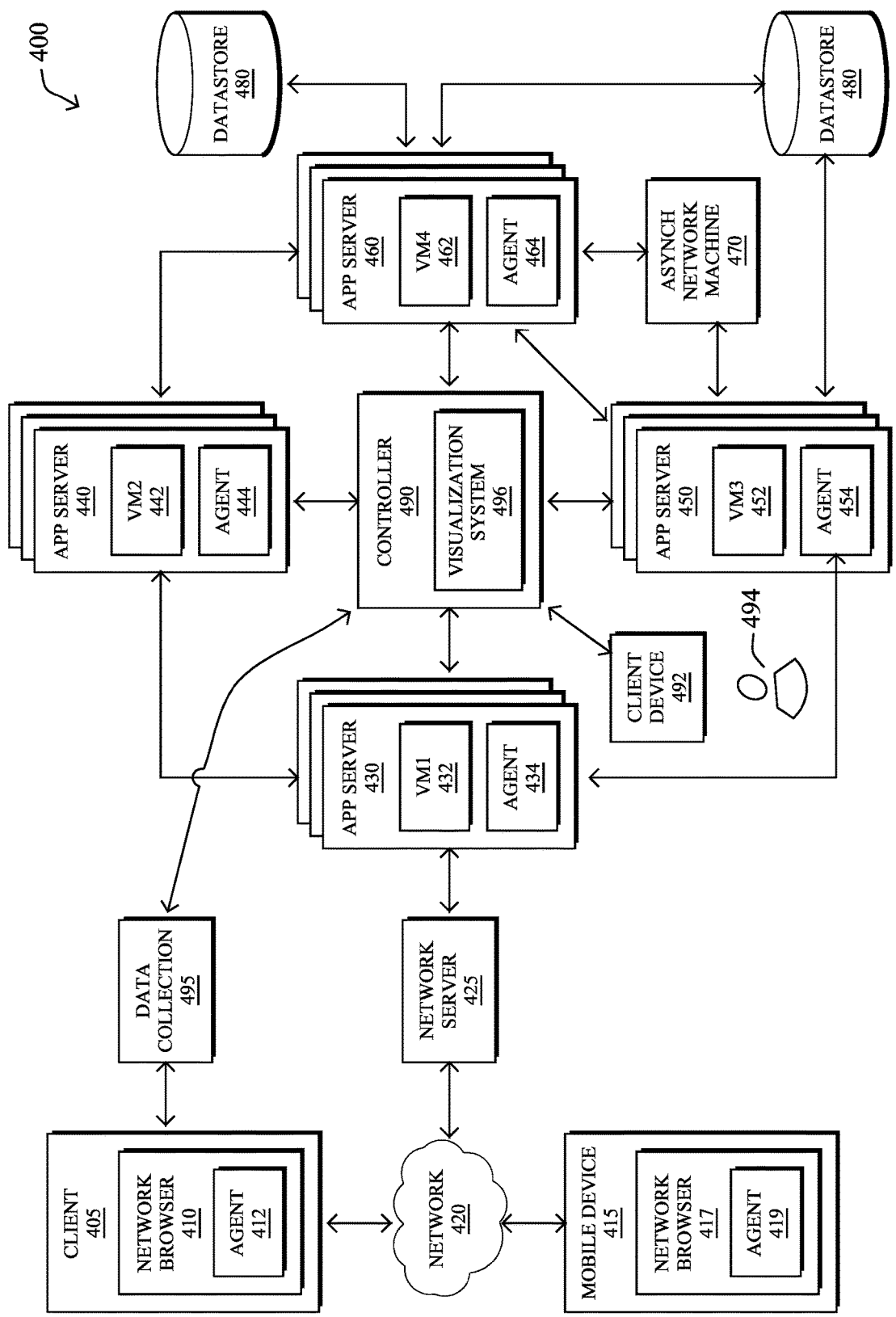
FIG. 4 illustrates an example system for an application-aware intrusion detection system.

FIG. 4 illustrates an example application intelligence platform (system) 400 for performing one or more aspects of the techniques herein. The system 400 in FIG. 4 includes client device 405 and 492, mobile device 415, network 420, network server 425, application servers 430, 440, 450, and 460, asynchronous network machine 470, data stores 480 and 485, controller 490, and data collection server 495. The controller 490 can include visualization system 496 for providing displaying of the report generated for performing the field name recommendations for field extraction as disclosed in the present disclosure. In some implementations, the visualization system 496 can be implemented in a separate machine (e.g., a server) different from the one hosting the controller 490.

Client device 405 may include network browser 410 and be implemented as a computing device, such as for example a laptop, desktop, workstation, or some other computing device. Network browser 410 may be a client application for viewing content provided by an application server, such as application server 430 via network server 425 over network 420.

Network browser 410 may include agent 412. Agent 412 may be installed on network browser 410 and/or client 405 as a network browser add-on, downloading the application to the server, or in some other manner. Agent 412 may be executed to monitor network browser 410, the operating system of client 405, and any other application, API, or another component of client 405. Agent 412 may determine network browser navigation timing metrics, access browser cookies, monitor code, and transmit data to data collection 460, controller 490, or another device. Agent 412 may perform other operations related to monitoring a request or a network at client 405 as discussed herein including report generating.

Mobile device 415 is connected to network 420 and may be implemented as a portable device suitable for sending and receiving content over a network, such as for example a mobile phone, smart phone, tablet computer, or other portable device. Both client device 405 and mobile device 415 may include hardware and/or software configured to access a web service provided by network server 425.

Mobile device 415 may include network browser 417 and an agent 419. Mobile device may also include client applications and other code that may be monitored by agent 419. Agent 419 may reside in and/or communicate with network browser 417, as well as communicate with other applications, an operating system, APIs and other hardware and software on mobile device 415. Agent 419 may have similar functionality as that described herein for agent 412 on client 405, and may repot data to data collection server 460 and/or controller 490.

Network 420 may facilitate communication of data among different servers, devices and machines of system 400 (some connections shown with lines to network 420, some not shown). The network may be implemented as a private network, public network, intranet, the Internet, a cellular network, Wi-Fi network, VoIP network, or a combination of one or more of these networks. The network 420 may include one or more machines such as load balance machines and other machines.

Network server 425 is connected to network 420 and may receive and process requests received over network 420. Network server 425 may be implemented as one or more servers implementing a network service, and may be implemented on the same machine as application server 430 or one or more separate machines. When network 420 is the Internet, network server 425 may be implemented as a web server.

Application server 430 communicates with network server 425, application servers 440 and 450, and controller 490. Application server 450 may also communicate with other machines and devices (not illustrated in FIG. 3). Application server 430 may host an application or portions of a distributed application. The host application 432 may be in one of many platforms, such as including a Java, PHP, .Net, and Node.JS, be implemented as a Java virtual machine, or include some other host type. Application server 430 may also include one or more agents 434 (i.e., "modules"), including a language agent, machine agent, and network agent, and other software modules. Application server 430 may be implemented as one server or multiple servers as illustrated in FIG. 4.

Application 432 and other software on application server 430 may be instrumented using byte code insertion, or byte code instrumentation (BCI), to modify the object code of the application or other software. The instrumented object code may include code used to detect calls received by application 432, calls sent by application 432, and communicate with agent 434 during execution of the application. BCI may also be used to monitor one or more sockets of the application and/or application server in order to monitor the socket and capture packets coming over the socket.

In some embodiments, server 430 may include applications and/or code other than a virtual machine. For example, servers 430, 440, 450, and 460 may each include Java code, .Net code, PHP code, Ruby code, C code, C++ or other binary code to implement applications and process requests received from a remote source. References to a virtual machine with respect to an application server are intended to be for exemplary purposes only.

Agents 434 on application server 430 may be installed, downloaded, embedded, or otherwise provided on application server 430. For example, agents 434 may be provided in server 430 by instrumentation of object code, downloading the agents to the server, or in some other manner. Agent 434 may be executed to monitor application server 430, monitor code running in a virtual machine 432 (or other program language, such as a PHP, .Net, or C program), machine resources, network layer data, and communicate with byte instrumented code on application server 430 and one or more applications on application server 430.

Each of agents 434, 444, 454, and 464 may include one or more agents, such as language agents, machine agents, and network agents. A language agent may be a type of agent that is suitable to run on a particular host. Examples of language agents include a Java agent, .Net agent, PHP agent, and other agents. The machine agent may collect data from a particular machine on which it is installed. A network agent may capture network information, such as data collected from a socket.

Agent 434 may detect operations such as receiving calls and sending requests by application server 430, resource usage, and incoming packets. Agent 434 may receive data, process the data, for example by aggregating data into metrics, and transmit the data and/or metrics to controller 490. Agent 434 may perform other operations related to monitoring applications and application server 430 as discussed herein. For example, agent 434 may identify other applications, share business transaction data, aggregate detected runtime data, and other operations.

An agent may operate to monitor a node, tier or nodes or other entity. A node may be a software program or a hardware component (e.g., memory, processor, and so on). A tier of nodes may include a plurality of nodes which may process a similar business transaction, may be located on the same server, may be associated with each other in some other way, or may not be associated with each other.

A language agent may be an agent suitable to instrument or modify, collect data from, and reside on a host. The host may be a Java, PHP, .Net, Node.JS, or other type of platform. Language agent may collect flow data as well as data associated with the execution of a particular application. The language agent may instrument the lowest level of the application to gather the flow data. The flow data may indicate which tier is communicating with which tier and on which port. In some instances, the flow data collected from the language agent includes a source IP, a source port, a destination IP, and a destination port. The language agent may report the application data and call chain data to a controller. The language agent may report the collected flow data associated with a particular application to a network agent.

A network agent may be a standalone agent that resides on the host and collects network flow group data. The network flow group data may include a source IP, destination port, destination IP, and protocol information for network flow received by an application on which network agent is installed. The network agent may collect data by intercepting and performing packet capture on packets coming in from one or more network interfaces (e.g., so that data generated/received by all the applications using sockets can be intercepted). The network agent may receive flow data from a language agent that is associated with applications to be monitored. For flows in the flow group data that match flow data provided by the language agent, the network agent rolls up the flow data to determine metrics such as TCP throughput, TCP loss, latency, and bandwidth. The network agent may then report the metrics, flow group data, and call chain data to a controller. The network agent may also make system calls at an application server to determine system information, such as for example a host status check, a network status check, socket status, and other information.

A machine agent may reside on the host and collect information regarding the machine which implements the host. A machine agent may collect and generate metrics from information such as processor usage, memory usage, and other hardware information.

Each of the language agent, network agent, and machine agent may report data to the controller. Controller 490 may be implemented as a remote server that communicates with agents located on one or more servers or machines. The controller may receive metrics, call chain data and other data, correlate the received data as part of a distributed transaction, and report the correlated data in the context of a distributed application implemented by one or more monitored applications and occurring over one or more monitored networks. The controller may provide reports, one or more user interfaces, and other information for a user.

Agent 434 may create a request identifier for a request received by server 430 (for example, a request received by a client 405 or 415 associated with a user or another source). The request identifier may be sent to client 405 or mobile device 415, whichever device sent the request. In embodiments, the request identifier may be created when a data is collected and analyzed for a particular business transaction.

Each of application servers 440, 450, and 460 may include an application and agents. Each application may run on the corresponding application server. Each of applications 442, 452, and 462 on application servers 440-460 may operate similarly to application 432 and perform at least a portion of a distributed business transaction. Agents 444, 454, and 464 may monitor applications 442-462, collect and process data at runtime, and communicate with controller 490. The applications 432, 442, 452, and 462 may communicate with each other as part of performing a distributed transaction. Each application may call any application or method of another virtual machine.

Asynchronous network machine 470 may engage in asynchronous communications with one or more application servers, such as application server 450 and 460. For example, application server 450 may transmit several calls or messages to an asynchronous network machine. Rather than communicate back to application server 450, the asynchronous network machine may process the messages and eventually provide a response, such as a processed message, to application server 460. Because there is no return message from the asynchronous network machine to application server 450, the communications among them are asynchronous.

Data stores 480 and 485 may each be accessed by application servers such as application server 450. Data store 485 may also be accessed by application server 450. Each of data stores 480 and 485 may store data, process data, and return queries received from an application server. Each of data stores 480 and 485 may or may not include an agent.

Controller 490 may control and manage monitoring of business transactions distributed over application servers 430-460. In some embodiments, controller 490 may receive application data, including data associated with monitoring client requests at client 405 and mobile device 415, from data collection server 460. In some embodiments, controller 490 may receive application monitoring data and network data from each of agents 412, 419, 434, 444, and 454 (also referred to herein as "application monitoring agents"). Controller 490 may associate portions of business transaction data, communicate with agents to configure collection of data, and provide performance data and reporting through an interface. The interface may be viewed as a web-based interface viewable by client device 492, which may be a mobile device, client device, or any other platform for viewing an interface provided by controller 490. In some embodiments, a client device 492 may directly communicate with controller 490 to view an interface for monitoring data.

Client device 492 may include any computing device, including a mobile device or a client computer such as a desktop, work station or other computing device. Client computer 492 may communicate with controller 390 to create and view a custom interface. In some embodiments, controller 490 provides an interface for creating and viewing the custom interface as a content page, e.g., a web page, which may be provided to and rendered through a network browser application on client device 492.

Applications 432, 442, 452, and 462 may be any of several types of applications. Examples of applications that may implement applications 432-462 include a Java, PHP, .Net, Node.JS, and other applications.

Figure 5:
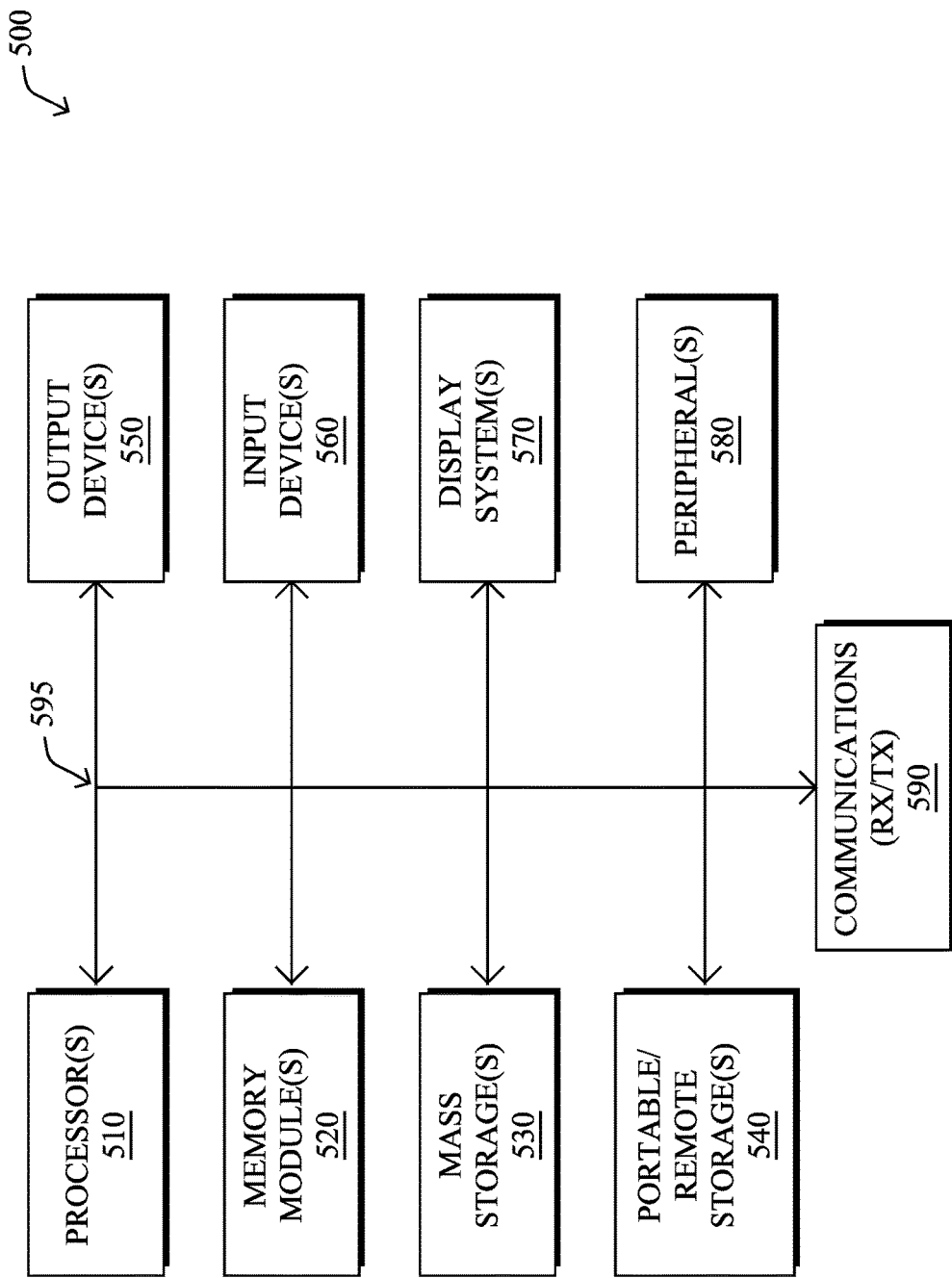
FIG. 5 illustrates an example computing system implementing the disclosed technology.

FIG. 5 is a block diagram of a computer system 500 for implementing the present technology, which is a specific implementation of device 200 of FIG. 2 above. System 500 of FIG. 5 may be implemented in the contexts of the likes of clients 405, 492, network server 425, servers 430, 440, 450, 460, a synchronous network machine 470, and controller 490 of FIG. 4. (Note that the specifically configured system 500 of FIG. 5 and the customized device 200 of FIG. 2 are not meant to be mutually exclusive, and the techniques herein may be performed by any suitably configured computing device.)

The computing system 500 of FIG. 5 includes one or more processors 510 and memory 520. Main memory 520 stores, in part, instructions and data for execution by processor 510. Main memory 510 can store the executable code when in operation. The system 500 of FIG. 5 further includes a mass storage device 530, portable storage medium drive(s) 540, output devices 550, user input devices 560, a graphics display 570, and peripheral devices 580.

The components shown in FIG. 5 are depicted as being connected via a single bus 590. However, the components may be connected through one or more data transport means. For example, processor unit 510 and main memory 520 may be connected via a local microprocessor bus, and the mass storage device 530, peripheral device(s) 580, portable or remote storage device 540, and display system 570 may be connected via one or more input/output (I/O) buses.

Mass storage device 530, which may be implemented with a magnetic disk drive or an optical disk drive, is a non-volatile storage device for storing data and instructions for use by processor unit 510. Mass storage device 530 can store the system software for implementing embodiments of the present invention for purposes of loading that software into main memory 520.

Portable storage device 540 operates in conjunction with a portable non-volatile storage medium, such as a compact disk, digital video disk, magnetic disk, flash storage, etc. to input and output data and code to and from the computer system 500 of FIG. 5. The system software for implementing embodiments of the present invention may be stored on such a portable medium and input to the computer system 500 via the portable storage device 540.

Input devices 560 provide a portion of a user interface. Input devices 560 may include an alpha-numeric keypad, such as a keyboard, for inputting alpha-numeric and other information, or a pointing device, such as a mouse, a trackball, stylus, or cursor direction keys. Additionally, the system 500 as shown in FIG. 5 includes output devices 550. Examples of suitable output devices include speakers, printers, network interfaces, and monitors.

Display system 570 may include a liquid crystal display (LCD) or other suitable display device. Display system 570 receives textual and graphical information, and processes the information for output to the display device.

Peripherals 580 may include any type of computer support device to add additional functionality to the computer system. For example, peripheral device(s) 580 may include a modem or a router.

The components contained in the computer system 500 of FIG. 5 can include a personal computer, hand held computing device, telephone, mobile computing device, workstation, server, minicomputer, mainframe computer, or any other computing device. The computer can also include different bus configurations, networked platforms, multi-processor platforms, etc. Various operating systems can be used including Unix, Linux, Windows, Apple OS, and other suitable operating systems, including mobile versions.

When implementing a mobile device such as smart phone or tablet computer, the computer system 500 of FIG. 5 may include one or more antennas, radios, and other circuitry for communicating over wireless signals, such as for example communication using Wi-Fi, cellular, or other wireless signals.

———Application-Context-Aware Firewall———

As noted above, security is paramount for the integrity and performance of an application. For instance, modern day application servers generally accept inbound connections, though outbound connections to external web services, databases, and/or mainframe gateways may also be established. Many of the applications on these servers rely on open source libraries that need to be trusted, i.e., assuming that the programming does not make "rogue connections" to malicious target hosts. Firewalls have long existed, and are very well understood by those skilled in the art. However, traditional firewalls, for both physical firewalls (i.e., network devices/boxes) and virtual firewalls (e.g., software operating on a server or user device) are limited in their capability. In particular, traditional firewalls are generally applied to all of the traffic from a device (e.g., "NO traffic is allowed to www.badhostname.com" or "deny ANY TCP traffic on port 80", etc.) and often have no context of an individual application associated with the traffic. Additionally, finer grained firewalls often require costly deep packet inspection (DPI) processing on the traffic in order to provide protection against information beyond what can be deduced from unencrypted packet header information.

The techniques herein, therefore, propose a mechanism for an application-context-aware firewall. In particular, the techniques herein "intercept" outbound connections for the purposes of performing firewall-based decisions (e.g., whitelist and/or blacklist) about a target host as well as the actual application code that is requesting the connection, i.e., an "application context".

For example, in one specific embodiment as described in greater detail below, the well-known Java Development Kit (JDK) by ORACLE allows for clients to communicate thru a specified default SOCKS or HTTP proxy server. Less known is a plugin interface within JDK that allows the use of a "Proxy Selector" (or "Proxy Switcher"), which can be used to make proxy decisions during runtime (i.e., is called in-line before making outbound network socket connections). The application-context-aware firewall techniques herein may thus be configured in one embodiment to act as a replacement "Proxy Selector", but instead of making a decision to proxy—it makes a firewall-based decision whether to allow the connection based on an "application context" according to one or more features of the outbound connection call (e.g., based on host name and/or the application and requesting module/package/class/method/etc.). If a connection is allowed, it will call the original Proxy Selector set (which is saved) and allow for normal operations, while on the other hand, if the connection is not allowed, the connection attempt will be terminated (e.g., generating a Security Exception) and the application is notified. In this manner, the techniques herein (and described in greater detail below) protect against "rogue" or unauthorized outbound connections from the application (e.g., made by malware), and allow for general auditing of outbound connections from third party libraries.

Specifically, according to one or more embodiments herein, an agent process associated with a particular application on a computing device intercepts outbound connection calls made by the particular application for a remote target host within a computer network, and determines an application context for the outbound connection call based on the particular application and one or more features of the outbound connection call. The agent process may then compare the application context against a set of application-context-aware firewall policies configured on the agent process, and determines whether to allow or not allow (block) the outbound connection call based on the comparing of the application context to the set of application-context-aware firewall policies.

Illustratively, the techniques described herein may be performed by hardware, software, and/or firmware, such as in accordance with the illustrative application-context-aware firewall process 248 (e.g., also referred to herein as an "agent process"), which may include computer executable instructions executed by the processor 220 to perform functions relating to the techniques described herein, e.g., in conjunction with other corresponding processes of the same device (e.g., applications 246) or of other devices in the computer network (e.g., controllers) as described herein.

Figure 6:
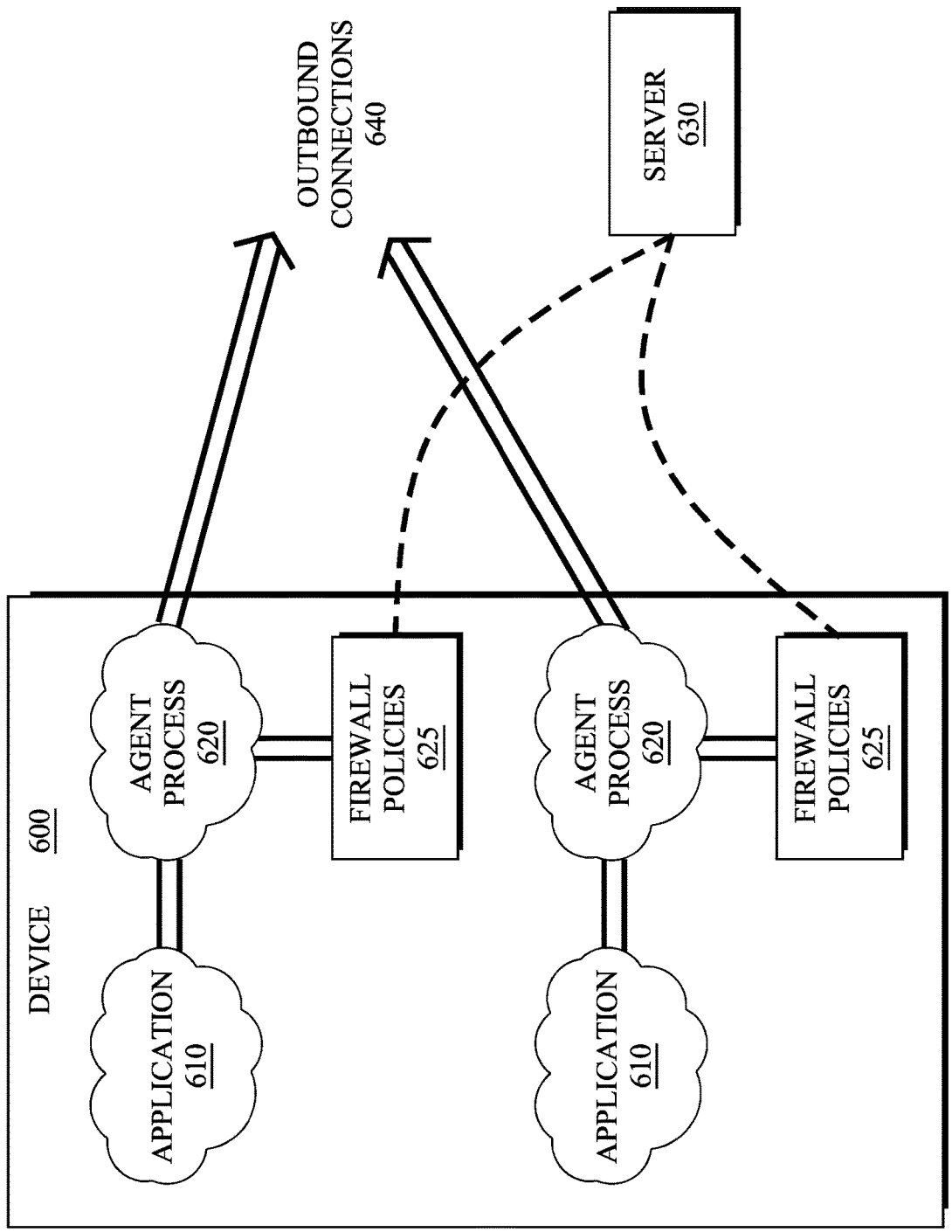
FIG. 6 illustrates an example of an application-context-aware firewall environment.

Operationally, FIG. 6 illustrates a simplified alternative view of a device 600 having one or more applications 610 that will attempt to make outbound connections 640. In accordance with the techniques herein, an application agent process 620 may be associated with each particular application (for which such services defined herein are desired, that is), where the agent operates in-line with the outbound connection calls made by the application in order to intercept and manage such calls, accordingly. Notably, the techniques herein may be applied within the application intelligence platform described above, or else may be independent firewall agents installed on the applications, or as part of any other suitable firewall location (physical or virtual) with adequate access to application context information.

As described herein, the agent processes may each have a set of corresponding application-context-aware firewall policies 625, which may be pre-configured, and/or configured (initialized, dynamically updated, etc.) by one or more remote servers 630. In particular, various whitelists (hosts/modules that CAN connect outbound) and blacklists (hosts/modules that CANNOT connect outbound) may be configured based on any number of features or characteristics of an outbound connection call. For instance, a whitelist and/or blacklist for outbound hosts to be allowed or blocked may comprise some configurable format for a uniform resource identifier (URI), such as:

allow.connections.host=goodhost,goodhost,goodhost,etc.
block.connections.host=badhost,badhost,badhost,etc.

In this instance, where the host is used to match the URI passed to the select method, the firewall policy match may be performed as follows:

@host—means host is a regex expression;
=host—means host is an exact match expression; and
host—means host is a substring match expression.

Essentially, if any allowed connections are specified—then the target URI must match at least one of the hosts specified and must NOT match any of the hosts specified in the blocked connections list.

According to the techniques herein, in addition to the host, the firewall policies 625 may also be based on other features that provide further context of the application. For instance, the techniques herein can base firewall decisions on where a call was made (e.g., based on stack trace information), what library made the call, what kind of call it is (e.g., database, web page, etc.), and so on. As an example, to configure a whitelist for outbound hosts to be allowed or blocked based on the code location for the connection, this is similar to the URI case above, except that in one particular embodiment it specifies that the connection call MUST be made from a Class and/or Method in order to be allowed (i.e., it may be configured as a whitelist only). This is a powerful feature to guard against "rogue" outbound calls in third party libraries that are not "seen" by the application. An example whitelist in this instance may comprise, e.g., allow.connections.context=ClassName.method,ClassName.method,etc.

Where ClassName.method is used to match the call stack representing the code location for the outbound Socket Call, the match may be performed as follows:

@ClassName.method—means host is a regex expression;
=ClassName.method—means host is an exact match expression; and
ClassName.method—means host is a substring match expression.

Essentially, if any allowed connections are specified—then the call stack must contain (match) at least one of the ClassName.method(s) specified. In one embodiment, this check will only be performed if the URI has passed the outbound hosts whitelist/blacklist first, as described above.

Notably, policies in general may be created based on the well-known Common Vulnerabilities and Exposures (CVE) and/or National Vulnerability Database (NVD), as well as administrator knowledge. Furthermore, various machine learning techniques may be used in order to define and/or refine the policies, such as scanning the application's code to determine connections that may be attempted and then defining the rules for those application connections explicitly, or else watching for a set of "normal connections" over a period of time, and then determining rules based on what's anomalous.

Moreover, policies need not be limited to static policies (e.g., always allow, always deny, etc.), but may be more behavioral in nature. For example, policies may be defined as sequential (e.g., allow this connection if and only if this other connection was previously established, deny this connection after another connection was already made, etc.), frequency based or rate-of-change/escalation based (e.g., don't allow more than so many connections within a certain time period, or stop allowing connections if the connection is being made more rapidly than ever before, etc.), and so on. Additionally, policies may be defined more granularly than allow or block, but may also be things such as "allow this connection, but notify the server when it happens", among others. Still further, the policies may be defined based on different levels of control, such as at corresponding to various times of application operation (e.g., log in, use, log out, certain times of day, certain days of the week, etc.). In essence, the techniques herein may apply any type of application-context-aware firewall policy given adequate insight by the agent process into the relevant application context features.

As noted above, and although other embodiments are also mentioned herein (e.g., ByteCode Instrumentation, BCI), the application agent may be correlated to the Java agents mentioned above. Normally, intercepting the actual outbound Java connection mechanism would require a BCI intercept of all outbound socket calls. However, as mentioned above, a Proxy Selector (or proxy switch) mechanism is built into the Java runtime (JDK version 1.5) that is designed to allow code to detect and route calls to a SOCKS or HTTP proxy (selecting the proxy server to use, if any, when connecting to the network resource referenced by a URL—e.g., "if you can't go to this node, go through this proxy"). In other words, the proxy selector feature is designed to be invoked before any outbound connection, in order to decide whether a proxy is needed before establishing an outbound connection.

Not widely known and not widely used (and notably not what it was designed for) this mechanism is "in-line" to every outbound connection and is an excellent location for adding the agent process 620 with its a whitelist/blacklist configuration to monitor and limit outbound connection calls, thus adding a layer of security and control to the application that is not already built into the JDK.

Figure 7A:
FIGS. 7A-7C illustrate an example of proxy selection replacement for one specific embodiment of an application-context-aware firewall.
Figure 7B:
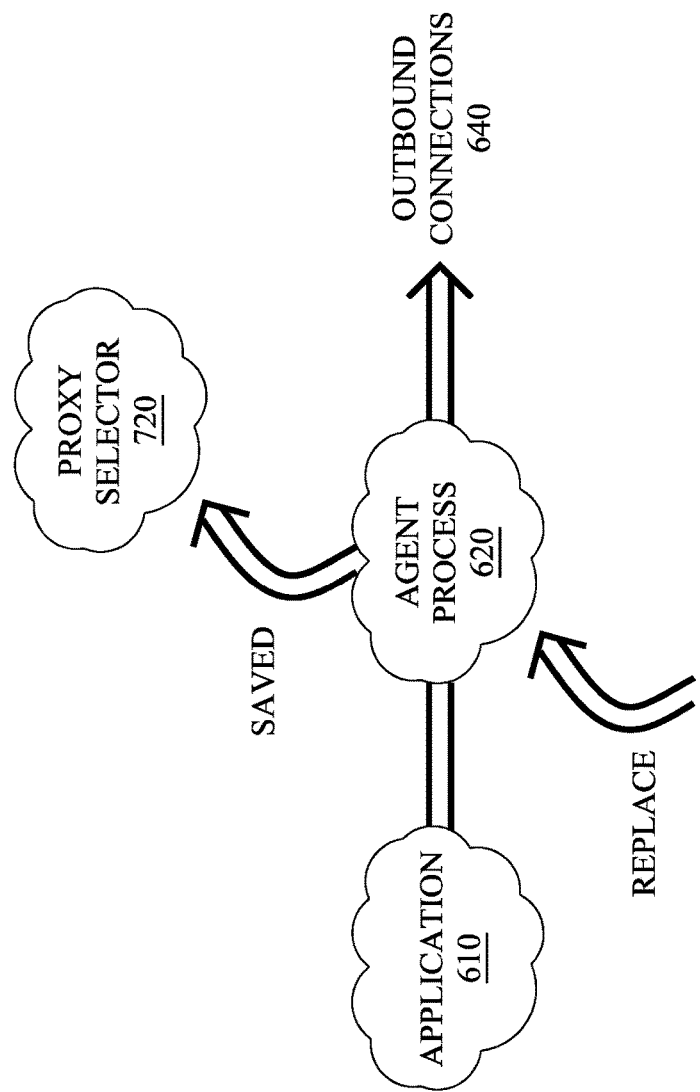
Figure 7C:
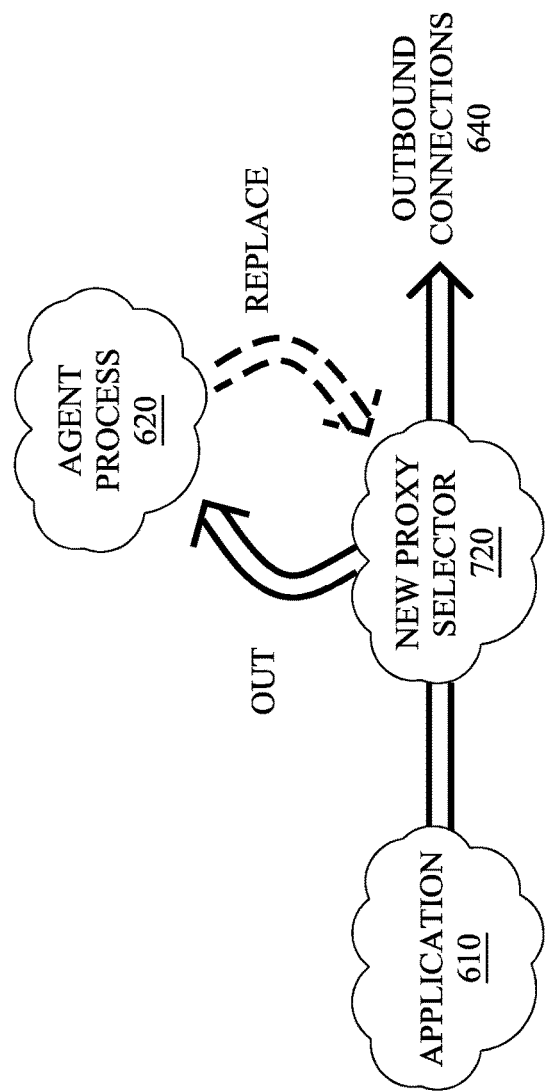

According to one or more illustrative embodiments, and with reference generally to environment 700 of FIGS. 7A-7C, a Java agent may be used to launch a Proxy Selector module 720 for an application 610, where the Proxy Selector module stores the original Selector (if set) and will automatically call it after it takes action on the target host. A registered Proxy Selector's select method is called before an outbound connection 640 is established on ANY TCP socket.

Specifically, in this example embodiment, with reference to FIG. 7A, a Java agent may be invoked on startup of the application 610, and premain calls the Java Agent premain method, which loads a "ProxySelectorHandlerMethodProxy.java" handler into an isolated Class Loader (e.g., to avoid any conflict with the application's classes). (Note that as will be appreciated by those skilled in the art, a handler is an intercepting class that contains a method to call on entry into an instrumented method, as well as a method to call on exit from an instrumented method.) The handler may then be initialized and reads illustrative properties file (e.g., a "proxySelectorHandlerMethodProxy.properties" file) and initializes the firewall policies (e.g., whitelist/blacklist) for the host names and application context, as described above.

With reference now to FIG. 7B, the handler gets the currently registered Proxy Selector 720 (e.g., a "getDefault( )" command), such that the currently registered Proxy Selector can be saved and replaced by the firewall Proxy Selector defined herein, i.e., the "agent process" 620. As mentioned above, the agent process 620 is specific to the particular application 610, and as demonstrated, may operate within the application. (Note further that because each agent process only has to account for a single application, the associated rule sets may be smaller than it would be for a general firewall that has to account for many (e.g., 50) different applications.)

At this point, the techniques herein wait for outbound connections to invoke the newly established Proxy Selector, i.e., the agent process 620. Note that as shown in FIG. 7C, the replacement of the current proxy selector may be performed periodically in order to ensure that no other "new" proxy selector or agent process has replaced the application-context-aware firewall agent process 620 in-line after the initial replacement configuration described in FIG. 7B above.

Figure 8:
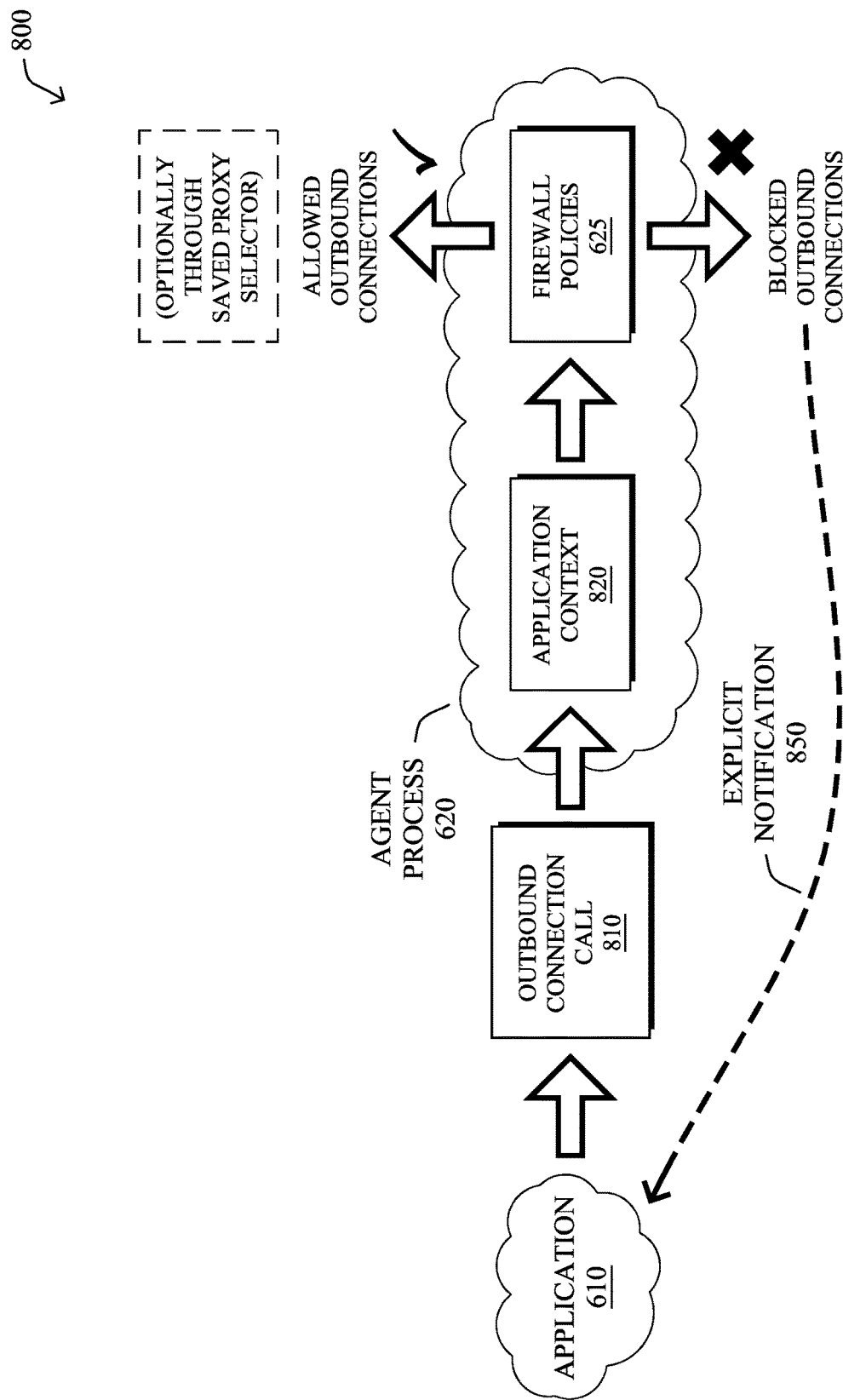
FIG. 8 illustrates an example operation of an application-context-aware firewall.

Regardless of how the agent process 620 is established in-line between the application 610 and outbound connections 640, FIG. 8 illustrates a more detailed illustration 800 of certain aspects of the application-context-aware firewall techniques described herein. In particular, once the agent process is in place, it waits for an outbound connection call 810 to made by the application, which invokes a selection action to pass the call through the agent process (as it would conventionally do to a proxy selector 720 in the example above, which is now replaced by the agent process 620). The agent process, receiving the outbound connection call, may then determine the application context 820, and apply it (compare it) to the firewall policies 625 as mentioned above. For instance, in one illustrative embodiment, the agent process 620 may first review the whitelist/blacklist for node name, and if the node name fails, the agent process may block the connection. If the node name passes, then the agent process may next review the whitelist/blacklist for the stack class.methodname (must/must not be in stack), again blocking the connection if failing the firewall lookup operation. On the other hand, if the application context is not to be denied by the firewall (i.e., is a success), then the techniques herein may allow the connection (which in the example proxy selector example above, may call the saved registered Proxy Selector 720 and let it decide what to do with the outbound connection call, accordingly).

Note that in one embodiment herein, an explicit notification 850 may be returned to the application 610 in the event of a blocked outbound connection. For instance, in one specific embodiment, when an application context fails the firewall protection above for a given outbound connection call, then the agent process 620 may throw a security exception (e.g., an illustrative "java.lang.SecurityException"), which essentially blocks the outbound connection, and returns a detailed error message (rather than merely producing a time-out or ambiguous network error message). In this instance, the application may generate a user-readable report of the error, or else may be configured to remediate the issue (e.g., preventing further calls to the denied outbound connection, using different outbound connections, and so on).

Figure 9:
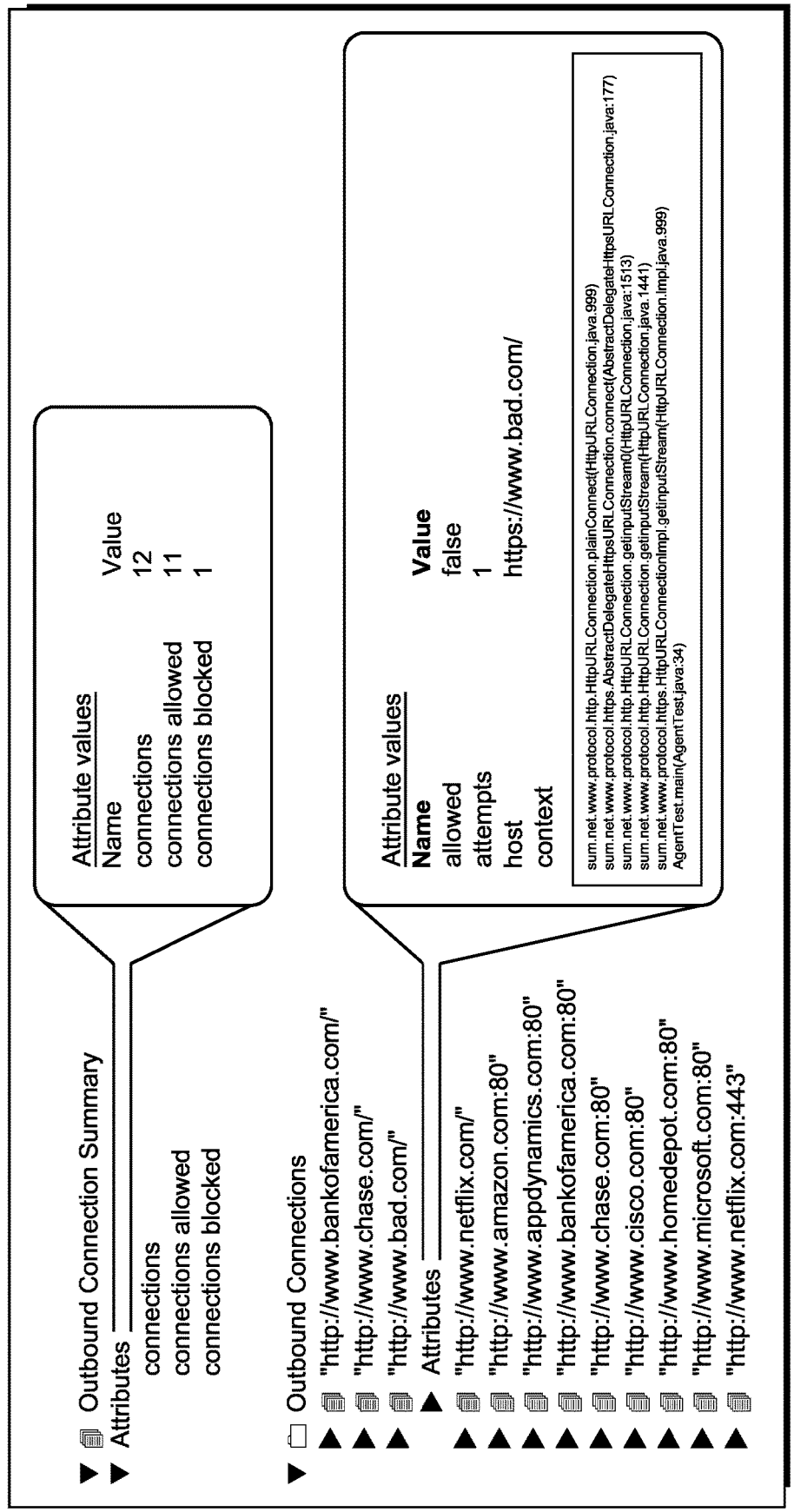
FIG. 9 illustrates an example simplified graphical user interface (GUI) for an application-context-aware firewall.

FIG. 9 illustrates an example graphical user interface (GUI) 900 showing an example displayed report of the application-context-aware firewall operation. For instance, the application agent process can report various metrics to the server (e.g., controller (630) and/or to a GUI 900 in order to allow a user/administrator to view the information and highlights. For instance, though any suitable GUI may be designed, and any useful information may be displayed, GUI 900 shows a collection of summaries (e.g., total numbers) as well as a more detailed view of all connections made (or attempted). For example, the GUI can demonstrate various reports about interactions with peers, such as whether a remote JMX is called, or whether there is another java agent associated with the application or other vulnerabilities, or how many times the application made a connection to a particular host target/node. Further drill downs (e.g., pop-up windows, list/index expansions, etc.) may also be used as shown to illustrate the metrics, the locations within the code where the blocked called were initiated, and so on. Having a GUI such as this helps manage connections, including root cause analysis and baselining (determining normal versus anomalous behavior).

Specifically, in one embodiment herein, a Java Agent may include a JMX MBean/Server Interface which can be used to publish the metrics and hosts as attributes and make them accessible to JMX consoles such as JConsole. (JMX MBeans is a managed Java object, similar to a JavaBeans component, that follows the design patterns set forth in the JMX specification. An MBean can represent a device, an application, or any resource that needs to be managed. A JMX Attribute defines a metric and metric data type exposed by the MBean. Also, JConsole is a widely distributed (with Java) JMX console (client) to browse JMX metrics and execute operations.) To access JMX to view the connections (e.g., using JConsole), all handlers may expose metrics/data via JMX which can then be displayed using JConsole, and as shown, GUI 900 shows the handler that reviews the Outbound Connections using JConsole. Looking at the illustrative connection to https://www.bad.com, it can be seen that the connection was not allowed and the location where the connection was made is highlighted.

Other metrics, data, information, reports, conclusion, suggestions, etc. may also be included within the GUI 900 to help visualize the operation of outbound connection calls for one or more applications. For instance, as mentioned above, various correlations may be made herein between the outbound connection calls and particular business transactions (GUIDs) or nodes), and also different visualizations may be made. For instance, certain nodes, devices, servers, or even particular business transactions may be marked at blocked, threatened, etc. In still further embodiments of the techniques herein, a business impact of a blocked outbound connection call can also be quantified. That is, because of a malicious code within an application (or other various reasons for denied connections), various business transactions may have been correspondingly affected (e.g., online purchases are halted or deleted, page visits were redirected to a malicious site, etc.). The techniques herein, therefore, may compare a given time period (e.g., a previously successful business transaction or set of transactions to an allowed target host) to the same or other comparable time period (e.g., a business transaction or set of transactions to a denied target host), to show any affect (e.g., value lost, transactions lost, visits missed, revenue difference, etc.) due to the blocked outbound connection.

Figure 10:
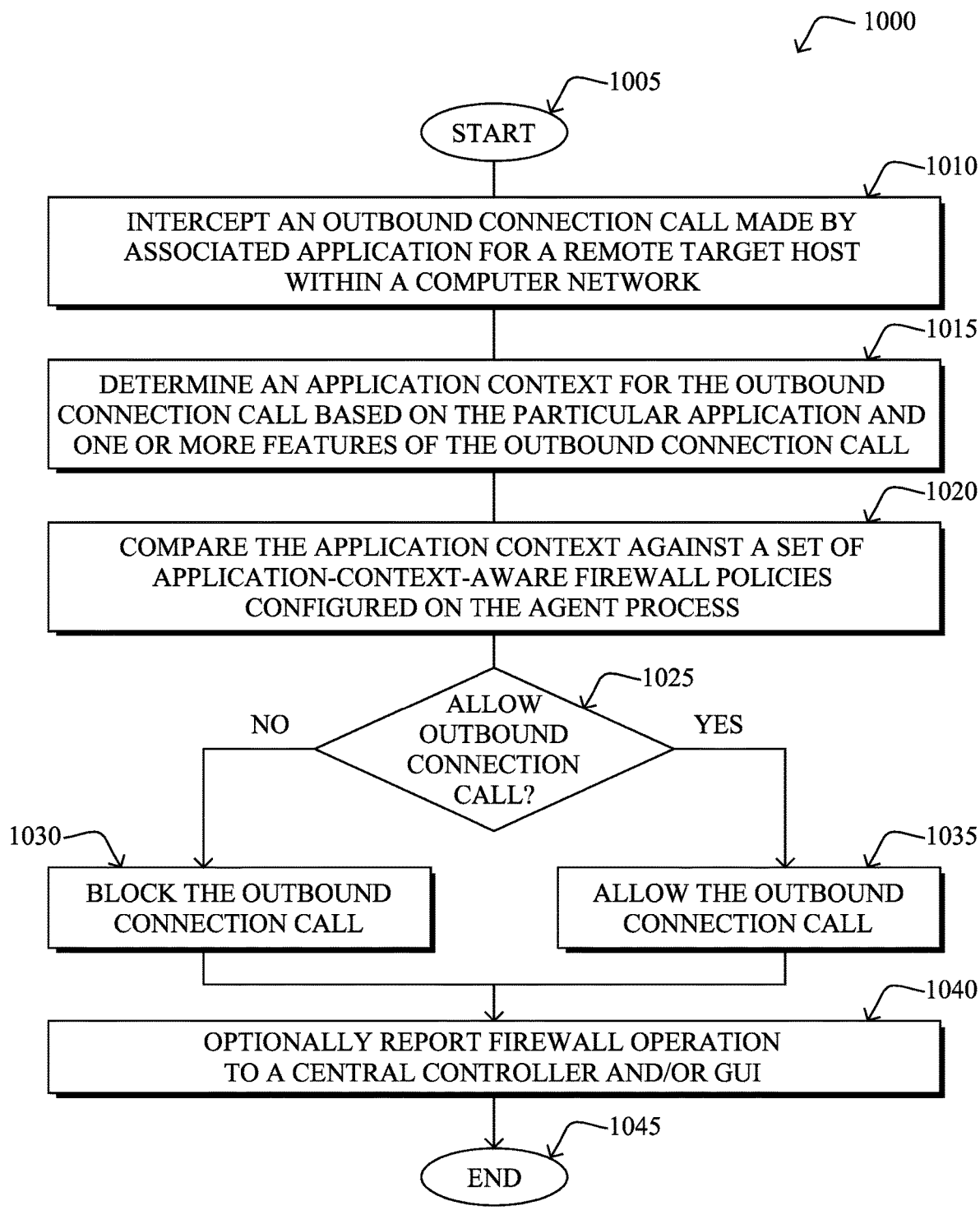
FIG. 10 illustrates an example simplified procedure for an application-context-aware firewall.

FIG. 10 illustrates an example procedure for providing an application-context-aware firewall in accordance with one or more embodiments described herein. For example, one or more non-generic, specifically configured devices (e.g., a server, a client device, etc.) may perform procedure 1000 by executing stored instructions (e.g., application-context-aware firewall process 248). For instance, in one illustrative embodiment, the stored instructions may be implemented as an agent process 620, which may be in conjunction with (e.g., installed as a component of) a particular application 610, as described herein (e.g., in-line with all outbound connection calls for the particular application). In one embodiment as noted above in particular, the agent process 620 may replace a proxy selector 720 associated with the particular application.

The procedure 1000 may start at step 1005, and continues to step 1010, where, as described in greater detail above, the agent process intercepts an outbound connection call 810 made by the particular application for a remote target host within a computer network. While in one embodiment the agent process is configured to receive all outbound connection calls, in one specific example embodiment, the particular application may attempt to invoke the replaced proxy selector 720 for all outbound connection calls, but instead reaches the agent process 620.

In step 1015 the agent process may then determine an application context 820 for the outbound connection call based on the particular application and one or more features of the outbound connection call. As described above, for example, features of the outbound connection call upon which the application context may be based could include such characteristics as the host name, module, class, method, package, protocol, and so on. Of course, the application context may also include the actual associated application making the call, though notably that context may be generally assumed in instances where the agent process corresponds to a single associated application.

In step 1020, the agent process may then compare the application context against a set of application-context-aware firewall policies 625 configured on the agent process (e.g., receiving configuration of the set of application-context-aware firewall policies on the agent process from a remote controller 630). As mentioned above, the policies may be either whitelist policies for allowing connections or blacklist policies for denying connections, and may also include one or more behavior-based policies (e.g., allowing connections once but not again, or allowing connections until their frequency increases too greatly, etc.). Accordingly, in step 1025, the agent process determines whether to allow the outbound connection call based on the comparing of the application context to the set of application-context-aware firewall policies.

In response to determining not to allow the outbound connection call based on the comparing of the application context to the set of application-context-aware firewall policies, then in step 1030 the agent process may block (deny, prevent, terminate, etc.) the outbound connection call. In one embodiment, the blocking in step 1030 may comprise sending an explicit notification 850 from the agent process to the particular application of the blocking (e.g., throwing a security exception in response to the outbound connection call).

On the other hand, in response to determining to allow the outbound connection call based on the comparing of the application context to the set of application-context-aware firewall policies, in step 1035 the agent process may allow the outbound connection call (e.g., relinquishing handling of the outbound connection call to the originally replaced proxy selector).

Optionally, in step 1040, various metrics, information, attributes, etc., may be reported to a central controller/server 630 (e.g., for further adaptation of the firewall policies, such as through machine learning techniques) and/or to a user in a GUI 900 (e.g., for further understanding and troubleshooting). Information within such reports could contain any pertinent data, such as one or more of: all outbound connection calls, allowed outbound connection calls, blocked outbound connection calls, computed metrics regarding outbound connection calls, target hosts for outbound connection calls, application contexts for outbound connection calls, and so on. Also, and particularly for the GUI, the report may result in displaying a location within software code of the particular application from which a blocked outbound connection call was made (e.g., the stack, the lines of code, the host names blocked, etc.).

The simplified example procedure 1000 may then end in step 1045, notably with the option to continue monitoring the outbound connection calls for further application-context-aware firewall operation. It should be noted, as well, that continuing the operation may more specifically comprise ensuring periodically that the agent process has not been replaced by a second proxy selector, as described above.

It should be noted that certain steps within procedure 1000 may be optional as described above, and the steps shown in FIG. 10 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide for an application-aware intrusion detection system. In particular, unlike traditional network-based firewalls or host-based firewalls, the techniques herein are built into the application runtime and have full application context for decision making. That is, in the techniques herein, firewall decisions are made based on application context criteria, such as which module, class, method, etc. initiated the connection call and what was the protocol to be used. Network and host-based firewalls have no visibility into any of the context behind an attempted connection. Also, by being a part of the application, there is no additional hardware and no additional drivers or processes involved, and more particularly, the firewall can apply specifically to the associated application instance (where network and host firewalls apply to all processes on the host). Moreover, the actual blocking of a connection herein may be implemented by reporting a detailed security exception directly back to the application, which is beneficial over standard connection time-outs or connection refused responses.

While there have been shown and described illustrative embodiments that provide for an application-context-aware firewall, it is to be understood that various other adaptations and modifications may be made within the spirit and scope of the embodiments herein. For example, while certain embodiments are described herein with respect to certain types of networks in particular, the techniques are not limited as such and may be used with any computer network, generally, in other embodiments. Moreover, while specific technologies, protocols, and associated devices have been shown, such as Java, TCP, IP, and so on, other suitable technologies, protocols, and associated devices may be used in accordance with the techniques described above. In addition, while certain devices are shown, and with certain functionality being performed on certain devices, other suitable devices and process locations may be used, accordingly. That is, the embodiments have been shown and described herein with relation to specific network configurations (orientations, topologies, protocols, terminology, processing locations, etc.). However, the embodiments in their broader sense are not as limited, and may, in fact, be used with other types of networks, protocols, and configurations.

Moreover, while the present disclosure contains many other specifics, these should not be construed as limitations on the scope of any invention or of what may be claimed, but rather as descriptions of features that may be specific to particular embodiments of particular inventions. Certain features that are described in this document in the context of separate embodiments can also be implemented in combination in a single embodiment. Conversely, various features that are described in the context of a single embodiment can also be implemented in multiple embodiments separately or in any suitable sub-combination. Further, although features may be described above as acting in certain combinations and even initially claimed as such, one or more features from a claimed combination can in some cases be excised from the combination, and the claimed combination may be directed to a sub-combination or variation of a sub-combination.

For instance, while certain aspects of the present disclosure are described in terms of being performed "by a server" or "by a controller", those skilled in the art will appreciate that agents of the application intelligence platform (e.g., application agents, network agents, language agents, etc.) may be considered to be extensions of the server (or controller) operation, and as such, any process step performed "by a server" need not be limited to local processing on a specific server device, unless otherwise specifically noted as such. Moreover, while the description above relates to an application intelligence platform generally, the techniques herein are not limited to use within an application intelligence platform environment, and may be used on any application, whether server-based, client-based, on standalone devices, collaborative devices, public or private networks, and so on.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in the present disclosure should not be understood as requiring such separation in all embodiments.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   replacing a proxy selector, which is associated with a particular application on a computing device, with an agent process;
   intercepting, by the agent process, an outbound connection call made by the particular application for a remote target host within a computer network;
   determining, by the agent process, an application context for the outbound connection call based on the particular application and one or more features of the outbound connection call;
   comparing, by the agent process, the application context against a set of application-context-aware firewall policies configured on the agent process;
   determining, by the agent process, whether to allow the outbound connection call based on the comparing of the application context to the set of application-context-aware firewall policies;
   blocking, by the agent process, the outbound connection call in response to determining not to allow the outbound connection call based on the comparing of the application context to the set of application-context-aware firewall policies; and
   ensuring periodically that the agent process has not been replaced by a second proxy selector.

2. The method as in claim 1, further comprising:
   allowing the outbound connection call in response to determining to allow the outbound connection call based on the comparing of the application context to the set of application-context-aware firewall policies.

3. The method as in claim 1, wherein blocking the outbound connection call further comprises:
   sending an explicit notification from the agent process to the particular application of the blocking.

4. The method as in claim 2, wherein sending the explicit notification comprises:
   throwing a security exception in response to the outbound connection call.

5. The method as in claim 1, further comprising:
   wherein the particular application attempts to invoke the proxy selector in response to all outbound connection calls and instead reaches the agent process.

6. The method as in claim 5, further comprising:
   allowing the outbound connection call in response to determining to allow the outbound connection call based on the comparing of the application context to the set of application-context-aware firewall policies, wherein allowing comprises relinquishing handling of the outbound connection call to the proxy selector.

7. The method as in claim 1, wherein the one or more features of the outbound connection call upon which the application context is based are selected from a group consisting of: the host name; a module; a class; a method; a package; and a protocol.

8. The method as in claim 1, wherein the set of application-context-aware firewall policies configured on the agent process comprise one or more behavior-based policies.

9. The method as in claim 1, wherein the set of application-context-aware firewall policies configured on the agent process comprise at least one of either whitelist policies for allowing connections or blacklist policies for denying connections.

10. The method as in claim 1, further comprising:
    receiving configuration of the set of application-context-aware firewall policies on the agent process from a remote controller.

11. The method as in claim 1, wherein the agent process is installed as a component of the particular application, and is in-line with all outbound connection calls for the particular application.

12. The method as in claim 1, further comprising:
reporting, by the agent process to a central controller, one or more of: all outbound connection calls; allowed outbound connection calls; blocked outbound connection calls; computed metrics regarding outbound connection calls; target hosts for outbound connection calls; and application contexts for outbound connection calls.

13. The method as in claim 1, further comprising:
reporting, by the agent process to a graphical user interface, a location within software code of the particular application from which a blocked outbound connection call was made.

14. A tangible, non-transitory, computer-readable medium storing program instructions that cause a computer to execute an agent process associated with a particular application on a computing device, the agent process comprising:
replacing a proxy selector, which is associated with the particular application, with the agent process;
intercepting an outbound connection call made by the particular application for a remote target host within a computer network;
determining an application context for the outbound connection call based on the particular application and one or more features of the outbound connection call;
comparing the application context against a set of application-context-aware firewall policies configured on the agent process;
determining whether to allow the outbound connection call based on the comparing of the application context to the set of application-context-aware firewall policies;
blocking the outbound connection call in response to determining not to allow the outbound connection call based on the comparing of the application context to the set of application-context-aware firewall policies; and
ensuring periodically that the agent process has not been replaced by a second proxy selector.

15. The computer-readable medium as in claim 14, wherein agent process further comprises:
allowing the outbound connection call in response to determining to allow the outbound connection call based on the comparing of the application context to the set of application-context-aware firewall policies.

16. The computer-readable medium as in claim 14, wherein blocking the outbound connection call further comprises:
sending an explicit notification from the agent process to the particular application of the blocking.

17. The computer-readable medium as in claim 14, wherein the particular application attempts to invoke the proxy selector in response to all outbound connection calls and instead reaches the agent process.

18. The computer-readable medium as in claim 17, wherein the agent process further comprises:
allowing the outbound connection call in response to determining to allow the outbound connection call based on the comparing of the application context to the set of application-context-aware firewall policies, wherein allowing comprises relinquishing handling of the outbound connection call to the proxy selector.

19. The computer-readable medium as in claim 14, wherein the one or more features of the outbound connection call upon which the application context is based are selected from a group consisting of: the host name; a module; a class; a method; a package; and a protocol.

20. The computer-readable medium as in claim 14, wherein the set of application-context-aware firewall policies configured on the agent process comprise one or more behavior-based policies.

21. An apparatus, comprising:
one or more network interfaces configured to communicate in a computer network;
a processor coupled to the network interfaces and adapted to execute one or more processes; and
a memory configured to store a particular application and an associated agent process executable by the processor, the agent process when executed operable to:
replace a proxy selector, which is associated with the particular application, with the agent process;
intercept an outbound connection call made by the particular application for a remote target host within a computer network;
determine an application context for the outbound connection call based on the particular application and one or more features of the outbound connection call;
compare the application context against a set of application-context-aware firewall policies configured on the agent process;
determine whether to allow the outbound connection call based on the comparing of the application context to the set of application-context-aware firewall policies; and
block the outbound connection call in response to determining not to allow the outbound connection call based on the comparing of the application context to the set of application-context-aware firewall policies; and
ensure periodically that the agent process has not been replaced by a second proxy selector.

22. The apparatus as in claim 21, wherein the agent process when executed further operable to:
allow the outbound connection call in response to determining to allow the outbound connection call based on the comparing of the application context to the set of application-context-aware firewall policies.

* * * * *